US008640147B2

(12) United States Patent
Park et al.

(10) Patent No.: US 8,640,147 B2
(45) Date of Patent: Jan. 28, 2014

(54) METHOD AND SYSTEM FOR VIRTUALIZING CONNECTION END-POINTS IN DISTRIBUTED, COMPONENT BASED APPLICATIONS AT RUNTIME

(75) Inventors: Yoonho Park, Hawthorne, NY (US); Philippe L. Selo, Hawthorne, NY (US); Chitra Venkatramani, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 568 days.

(21) Appl. No.: 12/944,246

(22) Filed: Nov. 11, 2010

(65) Prior Publication Data

US 2012/0124597 A1    May 17, 2012

(51) Int. Cl.
*G06F 9/44* (2006.01)
*G06F 11/00* (2006.01)

(52) U.S. Cl.
USPC .......................................... 719/320; 714/47.1

(58) Field of Classification Search
None
See application file for complete search history.

(56) References Cited

U.S. PATENT DOCUMENTS

| 5,519,833 | A | 5/1996 | Agranat et al. | |
|---|---|---|---|---|
| 6,311,265 | B1 * | 10/2001 | Beckerle et al. | 712/203 |
| 6,886,168 | B2 * | 4/2005 | Callaway et al. | 719/316 |
| 7,562,355 | B2 | 7/2009 | Gu et al. | |
| 7,954,113 | B2 * | 5/2011 | Yamashita et al. | 719/320 |
| 2004/0167806 | A1 | 8/2004 | Eichhorn et al. | |
| 2006/0026513 | A1 | 2/2006 | Eschbach et al. | |
| 2006/0069758 | A1 * | 3/2006 | Hunt et al. | 709/220 |
| 2007/0263007 | A1 | 11/2007 | Robotham et al. | |
| 2008/0168082 | A1 * | 7/2008 | Jin et al. | 707/102 |
| 2008/0188987 | A1 | 8/2008 | Gu et al. | |
| 2008/0235685 | A1 | 9/2008 | Amini et al. | |
| 2008/0244072 | A1 | 10/2008 | Broberg et al. | |
| 2009/0259612 | A1 | 10/2009 | Hanson | |
| 2009/0300615 | A1 * | 12/2009 | Andrade et al. | 718/100 |
| 2009/0313614 | A1 | 12/2009 | Andrade et al. | |
| 2010/0174770 | A1 | 7/2010 | Pandya | |

OTHER PUBLICATIONS

Guido Lemas De Souza Filho et al., "Ginga-J: The Procedural Middleware for the Brazilian Digital TV system," J. Braz. Comp. Soc. vol. 12 No. 4, Campinas, Mar. 2007, pp. 47-56.
C. Koulamas et al., "A Framework for the Implementation of Adaptive Streaming Systems," WMuNeP'07, Oct. 22, 2007, Chania, Crete Island, Greece, pp. 23-26.

(Continued)

*Primary Examiner* — Charles E Anya
(74) *Attorney, Agent, or Firm* — William Stock

(57) ABSTRACT

A method, system and computer program product of setting up a virtual connection at run time. The method includes the steps of: analyzing a topology of an application to determine at least one port pair where the port pair comprises an output port of a first operator and an input port of a second operator; configuring a first auxiliary operator to receive data from a first operator; configuring a second auxiliary operator to send data to a second operator; deploying the first operator, the second operator, the first auxiliary operator and the second auxiliary operator; receiving a function address of the second auxiliary operator; and sending the function address of the second auxiliary operator to a first destination; where at least one of the steps is carried out using a computer device so that the virtual connection is setup at run time.

18 Claims, 12 Drawing Sheets

(56) References Cited

OTHER PUBLICATIONS

Syed Asad Hussain, "Active and programmable networks for adaptive architectures and services", Auerbach Publications, Taylor and Francis Group, 6000 Broken Sound Parkway NW, Suite 300, Boca Raton, FL, Aug. 2007.

Lisa Amini et al., "Adaptive Control of Extreme-scale Stream Processing Systems," Proceedings of the 26th IEEE International Conference on Dstributed Computing Systems, 2006.

Lisa Amini, "Stream Processing: what's in it for you?", Exploratory Stream Processing, IBM T.J. Watson Research Center, Sep. 12, 2007.

\* cited by examiner

US 8,640,147 B2

METHOD AND SYSTEM FOR VIRTUALIZING CONNECTION END-POINTS IN DISTRIBUTED, COMPONENT BASED APPLICATIONS AT RUNTIME

STATEMENT REGARDING FEDERALLY SPONSORED RESEARCH OR DEVELOPMENT

This invention was made with Government support under Contract No.: H98230-07-C-0383 awarded by the United States Department of Defense. The Government has certain rights in this invention.

BACKGROUND OF THE INVENTION

The present invention relates to distributed, component based applications. More specifically, a technique for enabling entities of distributed, component based applications to manipulate an application's topology at runtime.

Today, some distributed programming systems expect an application developer to specify an application topology. For example, the Message Passing Interface (MPI) expects the application topology to be completely specified. Similarly stream-processing languages expect an application's connections to either be specified by name or by property. In addition, connections among the components of the application are determined by the application developer within SPL. In most of these systems, compilation of the application associates transports between components. This association prevents entities such as end-users, administrators, application-specific coordinators and middleware that manage these applications from manipulating the topology at application runtime.

Manipulating an application's topology at application runtime is useful for many reasons such as inserting probes at various points of the application to study performance, associating optimal transports depending on the traffic characteristics and inserting traffic shaping operators such as splitters and mergers.

As a result, a method for dynamically manipulating a distributed, component-based application's topology and underlying transports at runtime is needed.

SUMMARY OF THE INVENTION

Accordingly, one aspect of the present invention provides a method of setting up a virtual connection at run time. The method includes the steps of: analyzing a topology of an application to determine at least one port pair where the port pair comprises an output port of a first operator and an input port of a second operator; configuring a first auxiliary operator to receive data from a first operator; configuring a second auxiliary operator to send data to a second operator; deploying the first operator, the second operator, the first auxiliary operator and the second auxiliary operator; receiving a function address of the second auxiliary operator; and sending the function address of the second auxiliary operator to a first destination; where at least one of the steps is carried out using a computer device so that the virtual connection is setup at run time.

Another aspect of the present invention provides a system for setting up a virtual connection at run time. The system includes: an analyzing module adapted to analyze a topology of an application to determine at least one port pair where the port pair includes an output port of a first operator and an input port of a second operator; a configuring module adapted to configure a first auxiliary operator to receive data from a first operator; a configuring module adapted to configure a second auxiliary operator to send data to a second operator; a deploying module adapted to deploy the first operator, the second operator, the first auxiliary operator and the second auxiliary operator; a receiving module adapted to receive a function address of the second auxiliary operator; and a sending module adapted to send the function address of the second auxiliary operator to a first destination.

Another aspect of the present invention provides a computer readable storage medium tangibly embodying a computer readable program code having computer readable instructions which when implemented, cause a computer to carry out the steps of a method. The method includes the steps of analyzing a topology of an application to determine at least one port pair where the port pair comprises an output port of a first operator and an input port of a second operator; configuring a first auxiliary operator to receive data from a first operator; configuring a second auxiliary operator to send data to a second operator; deploying the first operator, the second operator, the first auxiliary operator and the second auxiliary operator; receiving a function address of the second auxiliary operator; and sending the function address of the second auxiliary operator to a first destination.

DETAILED DESCRIPTION OF THE PREFERRED EMBODIMENTS

An embodiment of the present invention is described in the context of a stream processing application. The stream processing application is expressed as a dataflow graph of analytics operators with stream interconnections. These operators are functions implemented as logical predicates, transformations rules or block of code. These operators are also interconnected via input and output ports. Further, streams of tuples flow over these connections. Processing Elements (PE) are processes which act as containers for the operators. A PE may contain more than one operator, in this case the operators are fused.

Figure 11:
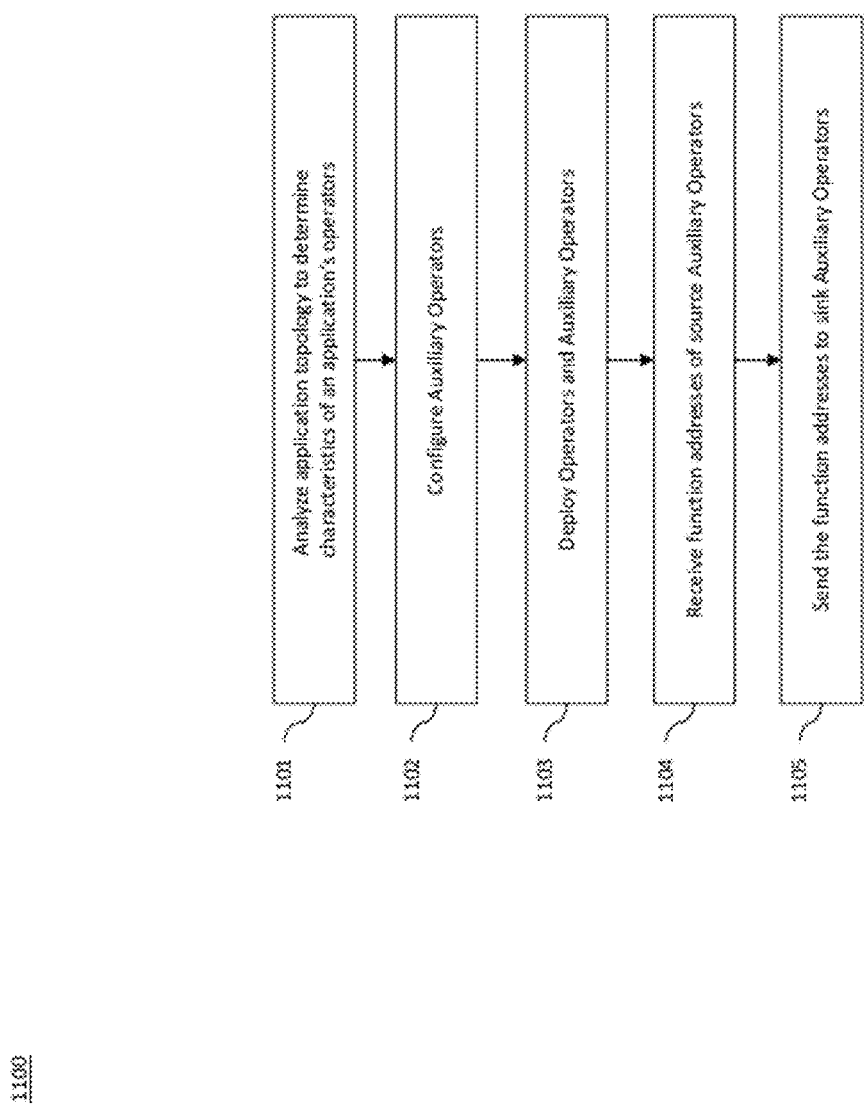
FIG. 11 is a flowchart illustrating a method 1100 of starting a stream processing application using virtual connections according to an embodiment of the present invention.

FIG. 11 is a flowchart illustrating a method 1100 of starting a stream processing application using virtual connections according to an embodiment of the present invention. The stream processing application is started in three main steps: (1) application augmentation, (2) application deployment, and (3) connection establishment directed by an application manager.

In the application augmentation step, the application's topology is analyzed to determine the characteristics of an application's operators in step 1001. Afterwards, auxiliary operators are added which allow the input and output ports to be virtualized and different transports to be deployed in step 1002. An auxiliary operator is an operator whose role is to establish the indirection required to perform the task without altering the data being processed. To an external observer, the result is identical with or without the auxiliary operator.

In the application deployment step, the original operators and auxiliary operators are deployed within processes or address spaces in step 1003. In the case of a source-sink application, the source and sink could be deployed in a single process or in multiple processes. When the application is deployed, the auxiliary operators are started.

In the connection establishment step, the application manager establishes connections between the appropriate auxiliary operators. The application manager can establish connections by receiving the function addresses of auxiliary operators which are sources in step 1004 and sending the received function addresses to auxiliary addresses which are sinks in step 1005.

Changes to the application deployment, topology, and transport can be made at run time by stopping the original operators, loading and unloading appropriate auxiliary operators, connecting them, and then resuming the original operators as will be shown later in FIG. 12.

Application Augmentation

Listed below are the four types of auxiliary operators according to an embodiment of the present invention. Adapters virtualize the input and output ports of the application and are used for communication within a process. Transport operators are used for communication between processes.

1. Adapter sink: An adapter sink has two input ports. The first input port is connected to the application manager. The second input port is connected to the output port of an application operator or a transport source described below.
2. Adapter source: An adapter source has two output ports. The first output port is connected to the application manager. The second output port is connected to the input port of an application operator or a transport sink described below.
3. Transport sink: A transport sink has two input ports. The first input port is connected to the application manager. The second input port is connected to the input port of an adapter source.
4. Transport source: A transport source has two output ports. The first output port is connected the application manager. The second output port is connected to the input port of an adapter sink.

When adapter sources (#2 above) and transport sources (#4 above) are started, they register with the application manager. Adapter sources register a function address. Transport sources register a connection port. When adapter sinks (#1 above) and transport sinks (#3 above) are started, they wait for the application manager to connect them to the appropriate adapter or transport source. Adapter sinks wait for a source function address. Transport sinks wait for a connection port.

Figure 1:
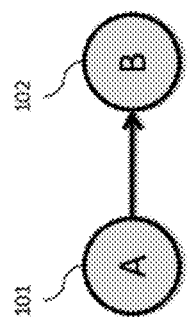
FIG. 1 shows an example of a source-sink application.
Figure 2:
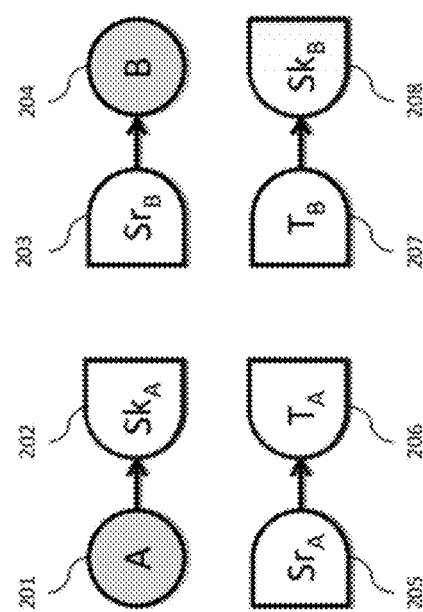
FIG. 2 shows an augmented source-sink application according to an embodiment of the present invention.

FIG. 1 shows a source-sink application. Here, Operator A 101 sends data via Operator A's output port to operator B's 102 input port. FIG. 2 shows an augmented source-sink application according to an embodiment of the present invention. An application is augmented by adding two adapter sinks, two adapter sources, a transport sink, and a transport source for every application stream with single end points. An adapter sink 202 ($Sk_A$) is connected to the output port of Operator A 201, and an adapter source 203 ($Sr_B$) is connected to the input port of Operator B 204. An adapter source 205 ($Sr_A$) is connected to a transport sink 206 ($T_A$), and an adapter sink 208 ($Sk_B$) is connected to a transport source 207 ($T_B$). Note that the application manager and connections to the application manager are not shown.

Figure 8:
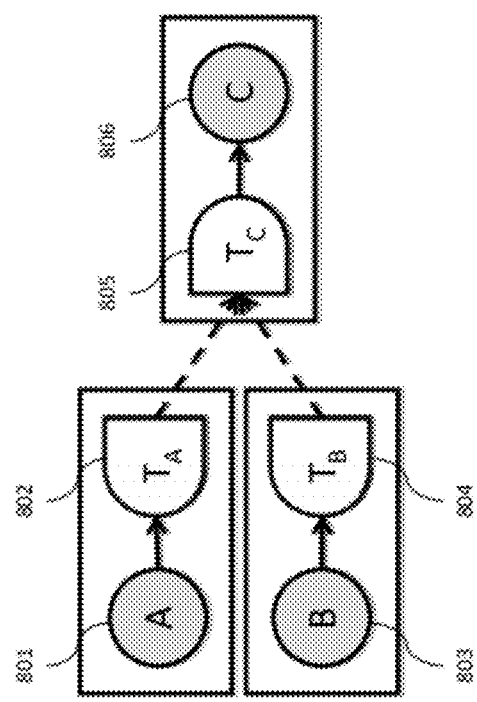
FIG. 8 shows an augmented source-sink application deployed as three processing elements with transport operators implementing the same protocol according to an embodiment of the present invention.
Figure 9:
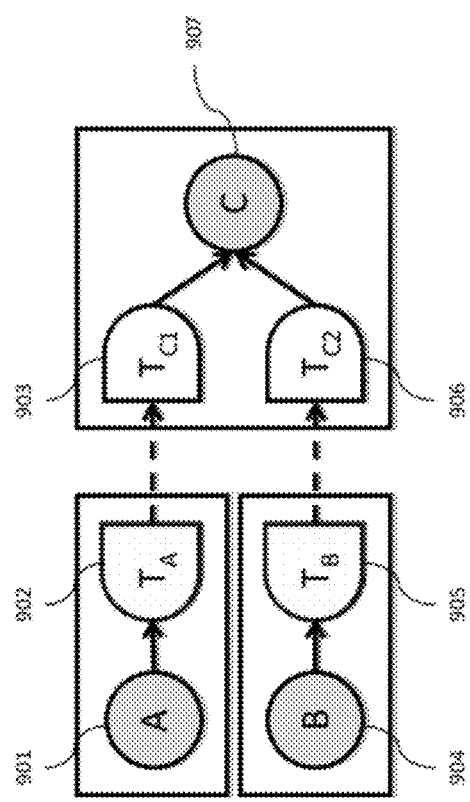
FIG. 9 shows another augmented source-sink application deployed as three processing elements with transport operators implementing different protocols according to an embodiment of the present invention.

In the case of a fan in or fan out (i.e. streams with multiple end points), there are two choices: (1) a set of auxiliary operators can be generated for each end point pair or (2) the adapters can coalesce the fan in sink or the fan out source. If the adapters coalesce the fan in sink or the fan out source, then the transport operators must handle the fan in or fan out as shown in FIGS. 8 and 9.

Application Deployment and Connection Establishment

Figure 3:
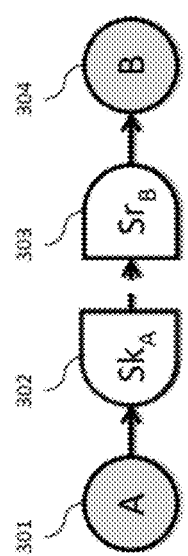
FIG. 3 shows the augmented source-sink application being deployed in a single process according to an embodiment of the present invention.

FIG. 3 shows the augmented source-sink application being deployed in a single process according to an embodiment of the present invention. When the operators are deployed, $Sk_A$ 302 and $Sr_B$ 303 are started. The application manager waits for $Sr_B$ 303 to register a function address. After the registration, the application manager sends the function address to $Sk_A$ 302. $Sk_A$ 302 can then send data to $Sr_B$ 303 using the function address, and A 301 can send data to B 304. Note that A's 301 connection to $Sk_A$ 302 and B's 304 connection to $Sr_B$ 303 was setup during the previous application augmentation step.

A 301 can start sending tuples at any time. If $Sk_A$ 302 does not have SrB's 303 function address, then $Sk_A$ 302 can be configured to either drop tuples from A 301 or block A 301. Dropping tuples from A 301 will avoid back pressure. Blocking A 301 will ensure reliable transport of the tuples.

Strictly speaking, the transport operators and associated adapters are not needed in a single process case. However, they are necessary in multiple process case as shown in FIG. 4.

Figure 4:
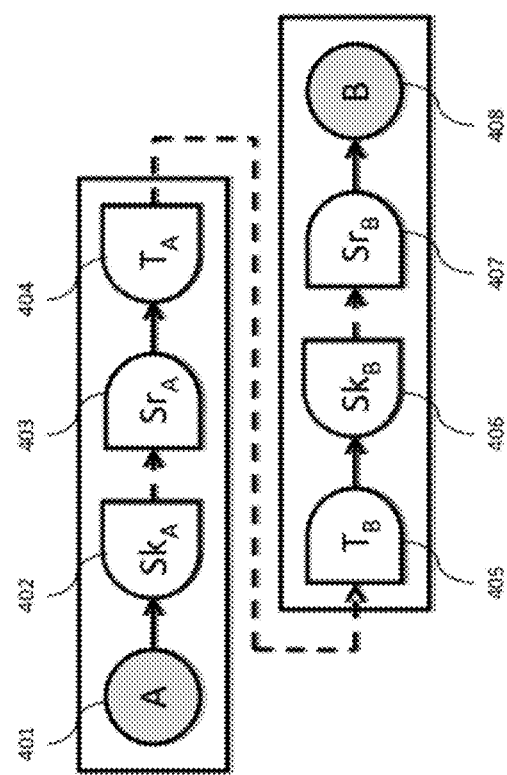
FIG. 4 shows the augmented source-sink application being deployed in separate processes according to an embodiment of the present invention.

FIG. 4 shows the augmented source-sink application being deployed in a multiple processes according to an embodiment of the present invention. In the case of multiple processes, operator A 401 is deployed in a process along with $Sk_A$ 402, $Sr_A$ 403, and $T_A$ 404. Operator B 408 is deployed in another process along with $Sk_B$ 406, $Sr_B$ 407, and $T_B$ 405. After the auxiliary sources ($Sr_A$ 403, $T_B$ 405, and $Sr_B$ 407) have registered with the application manager, the application manager notifies the auxiliary sinks ($Sk_A$ 402, $T_A$ 404, and $Sk_B$ 406). $Sk_A$ 402 is given the function address registered by $Sr_A$ 403. $T_A$ 404 is given the connection port registered by $T_B$ 405. $Sr_B$ 407 is given the function address registered by $Sk_B$ 406. After the auxiliary sinks have completed their connections, Operator A 401 can send data to Operator B 408.

Run Time Deployment Changes

Figure 12:
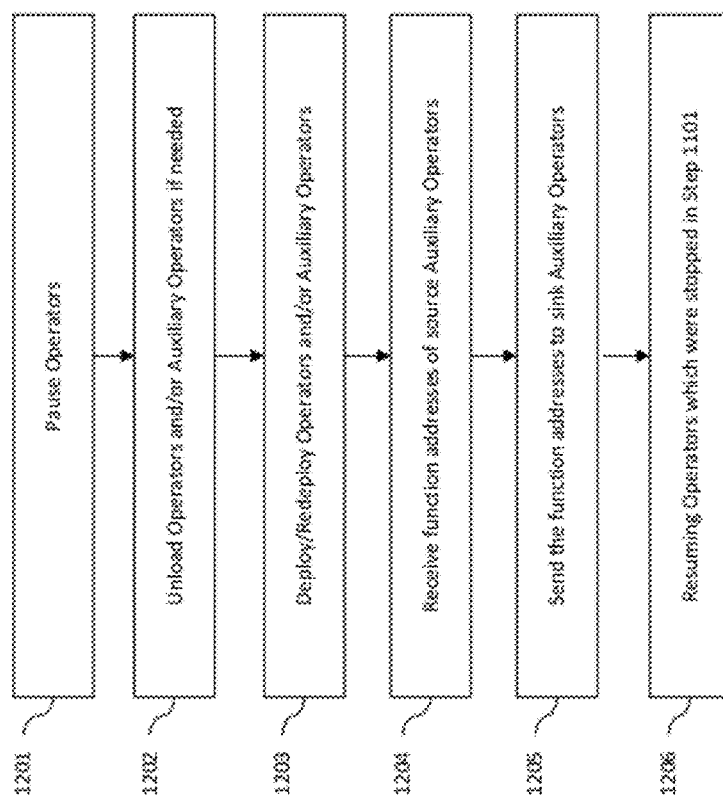
FIG. 12 is a flowchart illustrating a method 1200 of changing the application's deployment or topology at run time according to an embodiment of the present invention.

FIG. 12 is a flowchart illustrating a method 1200 of changing the application's deployment at run time according to an embodiment of the present invention. The adapters allow changes to the deployment at run time. Suppose the source-sink application is deployed in a single process as in FIG. 3 but not enough computational power is available on the machine to support both of the operators. The source and sink operators should be moved to separate processes on different machines as shown in FIG. 4. Accordingly, the application needs to change its deployment from the architecture shown in FIG. 3 to the architecture shown in FIG. 4. In FIG. 4, the two rectangles which surround the two groups of operators (i.e. A→$Sk_A$→$Sr_A$→$T_A$ and $T_B$→$Sk_B$→$Sr_B$→B) represent two different processes running on two different machines according to an embodiment of the present invention. The application manager makes this deployment change by executing the following steps as shown using a combination of FIGS. 3, 4 and 12:

1. Pause A 301 in step 1201.
2. Unload B 304, $Sk_A$ 302, and $Sr_B$ 303 from the PE on the first machine in step 1202.
3. Load $Sr_A$ 403 and $T_A$ 404 in the PE on the first machine in step 1203.
4. Load B 408, $Sr_B$ 407, and $T_B$ 405 in a new PE on a different machine in step 1203.
5. Receive the function addresses of the source auxiliary operators (i.e. $Sr_B$ 407, $T_B$ 405 and $Sr_A$ 403) in step 1204.
6. Send the received function addresses to the appropriate sink auxiliary operators (i.e. $Sr_B$'s 407 address is sent to $Sk_B$ 406, $T_B$'s 405 address is sent to $T_A$ 404 and $Sr_A$'s 403 address is sent to $Sk_A$ 402) in step 1205.
7. The sink auxiliary operators will now send data to the function address it received. (Not Shown in FIG. 12)
8. Resume A 401 in step 1206.

Run Time Topology Changes

Figure 5:
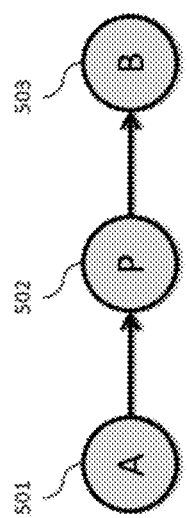
FIG. 5 shows an example of a source-sink application with a performance probe.
Figure 6:
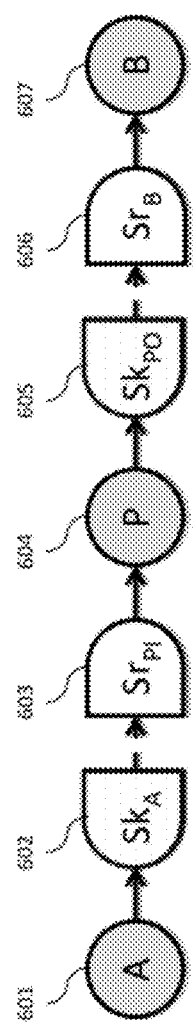
FIG. 6 shows the augmented source-sink application being deployed in a single process with a performance probe according to an embodiment of the present invention.

The adapters allow changes to the topology at run time. Suppose we want to insert a performance probe into the source-sink application as shown in FIG. 5 where P 502 is the performance probe between Operator A 501 and Operator B 503. Accordingly, the application needs to change its topology from FIG. 1 to FIG. 5. FIG. 6 shows an architecture which will accomplish this according to an embodiment of the present invention. It should be noted that the addition of a performance probe is just one of many ways an application topology can be changed. For example, arbitrary code can be substituted for the performance probe. In addition, the performance probe operator can be a collection of operators implementing some functionality.

FIG. 6 shows a source-sink application with a performance probe deployed in a single process. The application manager makes this deployment change by executing the following steps as shown using a combination of FIGS. 1, 6 and 12:

1. Pause A 101 in step 1201.
2. Since there are no auxiliary operators, there is no need to unload any auxiliary operators in step 1202.
3. Load $Sk_A$ 602, $Sr_B$ 606, the performance probe P 604 and the auxiliary operators for P's input and output ports $Sr_{PI}$ 603 and $Sk_{PO}$ 605 in the PE in step 1203.
4. Receive the function addresses of the source auxiliary operators (i.e. $Sr_B$ 606 and $Sr_{PI}$ 603) in step 1204.
5. Send the received function addresses to the appropriate sink auxiliary operators (i.e. $Sr_B$'s 606 address is sent to $Sk_{PO}$ 605, $Sr_{PI}$'s 603 address is sent to $Sk_A$ 602) in step 1205.
6. $Sk_A$ 602 and $Sk_{PO}$ 605 of the performance probe 604 are now configured to send data to the function address it received. (Not shown in FIG. 12)
7. Resume A 601 in step 1206.

Operator A 601 can then send data to Operator B 607 while being measured by performance probe P 604. It should be noted that P can also be removed using the same method.

Figure 10:
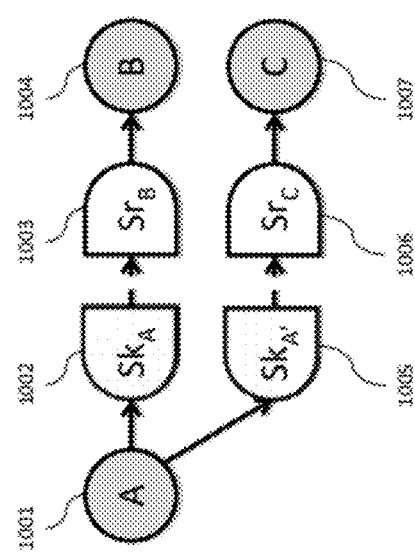
FIG. 10 is a flowchart illustrating a method 1000 of adding an output port to an operator at run time according to an embodiment of the present invention

FIG. 10 is a flowchart illustrating a method 1000 of adding an output port to an operator at run time according to an embodiment of the present invention. When the operator discovers a new category of data and wants to create a new stream for that data, the operator needs another output port. When this occurs, the operator notifies the application manager. The application manager would then deploy a new operator connected to original operator. The new operator would only output the new data type. The application manager makes this change by executing the following steps as shown using a combination of FIGS. 4, 10 and 12:

1. Pause A 401 in step 1201.
2. Since a new data stream is being added, there is no need to unload any auxiliary operators in step 1202.
3. Load $Sk_{A'}$ 1005, $Sr_C$ 1006 in step 1203.
4. Receive the function addresses of the source auxiliary operators (i.e. $Sr_C$ 1006) in step 1204.
5. Send the received function addresses to the appropriate sink auxiliary operators (i.e. $Sr_C$'s 1006 address is sent to $Sk_{A'}$ 1005) in step 1205.
6. $Sk_{A'}$ 1005 will now send data to the function address it received. (Not shown in FIG. 12)
7. Resume A 401 in step 1206.

Transport Flexibility

Transport operators provide numerous advantages. First, different transports can be implemented easily because transport operators are developed like any other application operator.

Second, transports can be changed at run time. Consider the source-sink application running on two machines. The machine running the source has both Ethernet and Infiniband available. The machine running the sink only has Ethernet. In this case, the transport operators must implement a protocol such as TCP or UDP that will work across Ethernet. Now suppose the sink is moved to a machine that only has Infiniband. Now the only available physical network between the source and sink is Infiniband. The transport operators can be exchanged with ones that implement an Infiniband protocol by unloading the existing transport operators and loading new transport operators that implement an Infiniband protocol.

Figure 7:
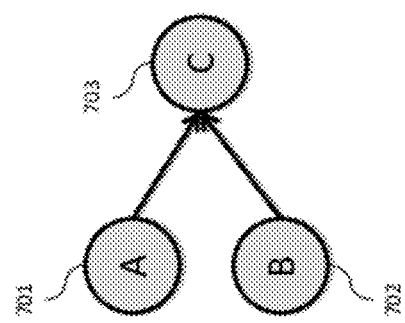
FIG. 7 shows an example of two operators fanning in to a third operator.

Third, different transports can be deployed for different streams even at a fan in or fan out. In FIG. 7 two sources, A 701 and B 702, fan in to a sink C 703. Each source has an output port and the sink has an input port.

FIG. 8 shows the application deployed as three PEs with transport operators implementing the same protocol according to an embodiment of the present invention. Both $T_A$ 702 and $T_B$ 704 send data to $T_C$ 705, and $T_C$ 705 is responsible for aggregating the data from $T_A$ 702 and $T_B$ 704. For example, if the transport operators are implementing TCP then $T_C$ 705 can perform a select or poll across the connections it has with $T_A$ 702 and $T_B$ 704.

FIG. 9 shows an alternate deployment in which the A→C stream has a different transport than the B→C stream according to another embodiment of the present invention. $T_A$ 902 and $T_{C1}$ 903 can be using a first transport protocol such as Ethernet while $T_B$ 905 and $T_{C2}$ 906 can be using a second protocol such as the InfiniBand protocol.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The invention claimed is:

1. A method of setting up a virtual connection at run time, the method comprising the steps of:
   analyzing a topology of an application to determine at least one port pair wherein said port pair comprises an output port of a first operator and an input port of a second operator;
   configuring a first auxiliary operator to receive data from a first operator;
   configuring a second auxiliary operator to send data to a second operator;
   deploying the first operator, the second operator, the first auxiliary operator and the second auxiliary operator;
   receiving a function address of the second auxiliary operator; and
   sending the function address of the second auxiliary operator to a first destination;
   pausing the first operator;
   unloading the first auxiliary operator and the second auxiliary operator;
   redeploying the first auxiliary operator and the second auxiliary operator;
   receiving another function address of the second auxiliary operator;
   sending the another function address of the second auxiliary operator to the first auxiliary operator; and
   resuming the first operator;
   wherein at least one of the steps is carried out using a computer device so that the virtual connection is setup at run time.

2. The method according to claim 1, further comprising the steps of:
   configuring a third auxiliary operator to transmit data to a third destination;
   configuring a fourth auxiliary operator to receive data from a fourth destination;
   deploying the third auxiliary operator and the fourth auxiliary operator;
   receiving a function address of the third auxiliary operator; and
   sending the function address of the third auxiliary operator to a second destination.

3. The method according to claim 2, wherein:
   the first destination is the fourth auxiliary operator; and
   the second destination is the first auxiliary operator.

4. The method according to claim 3, wherein:
the third destination is an input port of a fourth operator; and
the fourth destination is an output port of the fourth operator.

5. The method according to claim 4 wherein the fourth operator is a performance probe.

6. The method according to claim 3, further comprising the step of:
receiving a function address of a second transport operator; and
sending the function address of the second transport operator to a first transport operator;
wherein the third destination is the first transport operator and the fourth destination is the second transport operator.

7. The method according to claim 6, further comprising the steps of:
analyzing the topology of the application to determine an output port of a third operator;
configuring a sixth auxiliary operator to send data to a third transport operator;
configuring a fifth auxiliary operator to receive data from the third operator;
deploying the fifth auxiliary operator and the sixth auxiliary operator;
receiving a function address of the sixth auxiliary operator;
sending the function address of the sixth auxiliary operator to the fifth auxiliary operator; and
sending the function address of the second transport operator to the third transport operator.

8. The method according to claim 6, further comprising the steps of:
analyzing the topology of the application to determine an output port of a third operator;
configuring a sixth auxiliary operator to send data to a third transport operator;
configuring a fifth auxiliary operator to receive data from the third operator;
configuring a fourth transport operator to send data to the fourth auxiliary operator;
deploying the fifth auxiliary operator, the sixth auxiliary operator and the fourth transport operator;
receiving a function address of the sixth auxiliary operator;
receiving a function address of the fourth transport operator;
sending the function address of the sixth auxiliary operator to the fifth auxiliary operator; and
sending the function address of the fourth transport operator to the third transport operator.

9. The method according to claim 1, wherein the first destination is the first auxiliary operator.

10. A system for setting up a virtual connection at run time, the system comprising:
an analyzing module adapted to analyze a topology of an application to determine at least one port pair wherein said port pair comprises an output port of a first operator and an input port of a second operator;
a configuring module adapted to configure a first auxiliary operator to receive data from a first operator;
a configuring module adapted to configure a second auxiliary operator to send data to a second operator;
a deploying module adapted to deploy the first operator, the second operator, the first auxiliary operator and the second auxiliary operator;
a receiving module adapted to receive a function address of the second auxiliary operator;
a sending module adapted to send the function address of the second auxiliary operator to a first destination;
a pausing module adapted to pause the first operator;
an unloading module adapted to unload the first auxiliary operator and the second auxiliary operator;
a redeploying module adapted to redeploy the first auxiliary operator and the second auxiliary operator;
a receiving module adapted to receive another function address of the second auxiliary operator;
a sending module adapted to send the another function address of the second auxiliary operator to the first auxiliary operator; and
a resuming module adapted to resume the first operator.

11. The system according to claim 10, further comprising:
a configuring module adapted to configure a third auxiliary operator to transmit data to a third destination;
a configuring module adapted to configure a fourth auxiliary operator to receive data from a fourth destination;
a deploying module adapted to deploy the third auxiliary operator and the fourth auxiliary operator;
a receiving module adapted to receive a function address of the third auxiliary operator; and
a sending module adapted to send the function address of the third auxiliary operator to a second destination.

12. The system according to claim 11 wherein:
the first destination is the fourth auxiliary operator; and
the second destination is the first auxiliary operator.

13. The system according to claim 12 wherein:
the third destination is an input port of a fourth operator; and
the fourth destination is an output port of the fourth operator.

14. The system according to claim 12 further comprising:
a receiving module adapted to receive a function address of a second transport operator; and
a sending module adapted to send the function address of the second transport operator to a first transport operator;
wherein the third destination is the first transport operator and the fourth destination is the second transport operator.

15. The system according to claim 14 further comprising:
an analyzing module adapted to analyze the topology of the application to determine an output port of a third operator;
a configuring module adapted to configure a sixth auxiliary operator to send data to a third transport operator;
a configuring module adapted to configure a fifth auxiliary operator to receive data from the third operator;
a deploying module adapted to deploy the fifth auxiliary operator and the sixth auxiliary operator;
a receiving module adapted to receive a function address of the sixth auxiliary operator;
a sending module adapted to send the function address of the sixth auxiliary operator to the fifth auxiliary operator; and
a sending module adapted to send the function address of the second transport operator to the third transport operator.

16. The system according to claim 14 further comprising:
an analyzing module adapted to analyze the topology of the application to determine an output port of a third operator;
a configuring module adapted to configure a sixth auxiliary operator to send data to a third transport operator;
a configuring module adapted to configure a fifth auxiliary operator to receive data from the third operator;

a configuring module adapted to configure a fourth transport operator to send data to the fourth auxiliary operator;

a deploying module adapted to deploy the fifth auxiliary operator, the sixth auxiliary operator and the fourth transport operator;

a receiving module adapted to receive a function address of the sixth auxiliary operator;

a receiving module adapted to receive a function address of the fourth transport operator;

a sending module adapted to send the function address of the sixth auxiliary operator to the fifth auxiliary operator; and a sending module adapted to send the function address of the fourth transport operator to the third transport operator.

17. The system according to claim 10, wherein the first destination is the first auxiliary operator.

18. A computer readable storage medium tangibly embodying a computer readable program code having computer readable instructions which when implemented, cause a computer to carry out the steps of a method comprising:

analyzing a topology of an application to determine an output port of a first operator and an input port of a second operator;

configuring a first auxiliary operator to receive data from a first operator;

configuring a second auxiliary operator to send data to a second operator;

deploying the first operator, the second operator, the first auxiliary operator and the second auxiliary operator;

receiving a function address of the second auxiliary operator;

sending the function address of the second auxiliary operator to a first destination;

pausing the first operator;

unloading the first auxiliary operator and the second auxiliary operator:

redeploying the first auxiliary operator and the second auxiliary operator;

receiving another function address of the second auxiliary operator:

sending the another function address of the second auxiliary operator to the first auxiliary operator; and resuming the first operator.

* * * * *